United States Patent [19]

DeTorre

[11] Patent Number: 5,423,240
[45] Date of Patent: Jun. 13, 1995

[54] SIDE-CROWNED CARBIDE CUTTING BLADES AND CUTTING DEVICES

[76] Inventor: Robert P. DeTorre, 1500 Monogahela Dr., White Oak, Pa. 15131

[21] Appl. No.: 154,098

[22] Filed: Nov. 18, 1993

[51] Int. Cl.6 .................... B23D 19/04; B23D 15/04
[52] U.S. Cl. ........................... 83/500; 83/675; 83/676; 83/694; 30/350; 30/357
[58] Field of Search ............ 83/673, 675, 676, 694, 83/697, 500, 501, 502, 503, 504, 508.3, 611; 30/347, 348, 349, 350, 357

[56] References Cited

U.S. PATENT DOCUMENTS

| | | | |
|---|---|---|---|
| 1,932,875 | 10/1933 | Addison et al. | 83/694 X |
| 1,949,066 | 2/1934 | Waner | 83/502 X |
| 2,244,053 | 6/1941 | Comstock | 30/350 |
| 2,579,773 | 12/1951 | Williams | 30/350 |
| 3,292,478 | 12/1966 | Falk et al. | 30/357 X |
| 3,411,208 | 11/1968 | Malm | 30/350 |
| 3,501,280 | 3/1970 | Myers | 83/676 X |
| 3,929,044 | 12/1975 | Beauchet | 30/357 X |
| 4,263,754 | 4/1981 | DeTorre | 51/288 |
| 4,382,397 | 5/1983 | DeTorre | 83/508 |
| 4,640,169 | 2/1987 | Fromson et al. | 83/685 |
| 4,972,750 | 11/1990 | Paavola | 83/675 X |

FOREIGN PATENT DOCUMENTS 2351762 12/1977 France ........................... 30/357

Primary Examiner—Rinaldi I. Rada
Assistant Examiner—Clark F. Dexter
Attorney, Agent, or Firm—Alex Mich, Jr.

[57] ABSTRACT

Blades with tungsten carbide cutting edges have a surface at a relief angle and a surface at a reverse angle at the periphery. A smooth crown is provided at the intersection of the surfaces. The crown will contact and be included within an overlap of a cooperating offset steel blade. The relief angle may be between about 1 and 3 degrees and the reverse angle about ¼ to 1 degree. The crown may have a finish of about 2-6 micro-inches. The contact between the blades during operation provides a polishing or self-sharpening effect. The tungsten carbide blades are used in rotating shear wheel devices and scissor cutting devices to cut tire cord fabric.

17 Claims, 2 Drawing Sheets

SIDE-CROWNED CARBIDE CUTTING BLADES AND CUTTING DEVICES

TECHNICAL FIELD

This invention relates in general to cutting blades and more specifically to cutting blades and devices for cutting tire cord fabrics.

BACKGROUND ART

Cutting or slitting rubberized tire fabric sheet material is a difficult task. The tire fabric has parallel steel or fabric cords embedded in uncured rubber. Such sheets are continuously bias cut to form sections for building a tire carcass. The blades must be forced together at relatively high pressures. The steel or fabric cords are made of multiple strands to provide the required strength in tire carcasses. Cords may, for example, be made with multiple thin or small diameter strands of nylon, polyester or aramide fiber. Steel cords, made from multiple thin or small diameter steel wire, are extensively used. Sheets reinforced with steel cord are usually the most difficult to cut or slit and cause the most rapid wear on overlapping cutting blades. High speed steel blades have been extensively used. To improve the performance of tires, manufacturers have begun to employ high tensile wire for the steel cord. The high tensile wire has a higher hardness than previously used steel wire. As a consequence of the higher hardness, the life of overlapping cutting blades has been reduced because of the more rapid wear. The more frequent sharpening obviously increases the cost of slitting or cutting.

Efforts to employ rotary blades with overlapping offset tungsten carbide cutting edges, while providing edges with higher hardness, have not been successful in providing longer useful life. The contacting blades chip because they are more brittle than tool steel. Efforts employing a square cut blade of tungsten carbide with an overlapping square cut tool steel caused rapid wear of the tool steel blade.

It would be desirable, and it is an object of this invention to provide overlapping cutting blades with improved, longer useful life and thus reduce the costs involved in resharpening the blades.

SUMMARY OF THE INVENTION

Briefly, the present invention employs a tungsten carbide blade having side surfaces with an angular radiused crown that may overlap and contact, for example, a square cut steel blade. In a preferred embodiment of the invention, a tungsten carbide preformed ring is bonded to a base steel circular plate. The carbide ring is finished to provide two angular side surfaces with a slightly rounded smooth side crown that will engage or contact a tool steel circular blade in the overlapping area of the two blades. In yet another embodiment of the invention, a similar crown is provided on one of two scissors blades.

BRIEF DESCRIPTION OF THE DRAWINGS

The invention will become more apparent by reading the following detailed description in conjunction with the drawings, which are shown by example only, wherein.

DESCRIPTION OF PREFERRED EMBODIMENTS

Figures 1, 2:
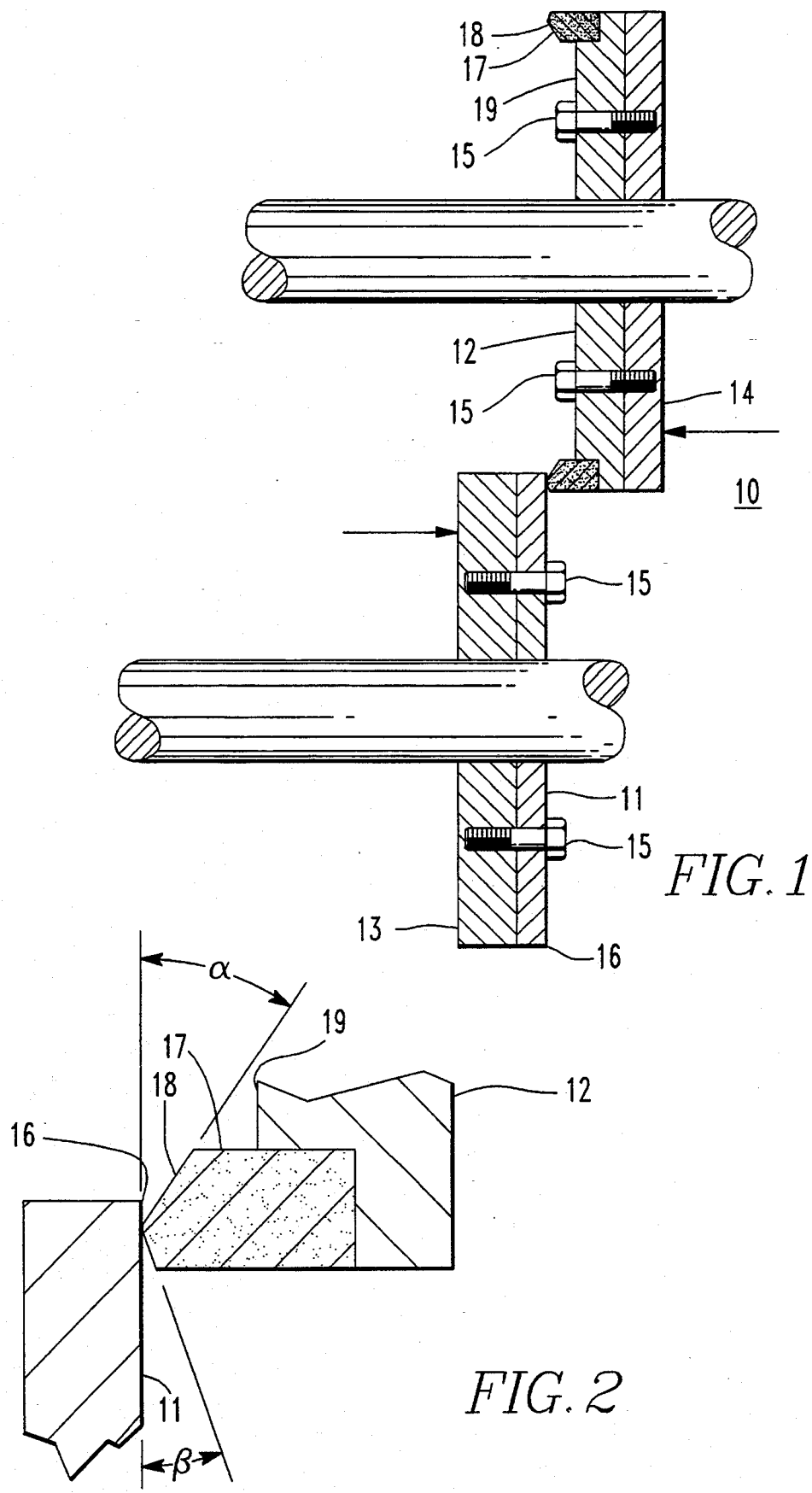
FIG. 1 is a fragmentary front view of a cutting device showing a cross-section of the rotary cutting blades.
FIG. 2 is an enlarged cross section of the edges of the blades of FIG. 1.

Referring now to the drawings, and to FIG. 1 in particular, there is shown a cutting device 10 including circular rotatable blades or shear wheels 11 and 12 secured to round mounting plates 13 and 14, respectively, by a plurality of bolts 15. The mounting plates are securely keyed (not shown) to counter-rotating shafts on axes spaced apart so the blades or wheels overlap and contact each other in a manner known in the art. Lower blade or shear wheel 11 with a square cut cutting edge 16 defined by a planar face and a circular peripheral surface of the wheel (shown enlarged in FIG. 2) is made from a high speed steel designed to give relatively high wear resistance. An example of a suitable high speed tool steel for cutting tire cord fabric is available from Crucible Specialty Metals as CPM REX M4. It contains 1.35% C, 0.30% Mn, 0.30% Si, 4.00% Cr, 4.00% V, 5.75% W and 4.50% Mo. Shear blades are a recognized application for this steel and it has been used for both upper and lower rotary cutting blades. It is typically hardened to $R_c$ 64–66 for such applications and has been used to make the lower blade herein. One general way of defining high speed tool steels that have been used for both rotary blades or the lower blade herein for cutting tire cord fabrics is in terms of Rockwell hardness. A range of $R_c$ 60–67 is suitable.

Upper blade or shear wheel 12 is made by bonding a circular tungsten carbide preform 17 to a circular groove at the periphery of the blade to provide an edge and side of tungsten carbide. A room temperature curable epoxy resin has been used as the bonding agent. A portion 18 of the tungsten carbide peripheral insert is extended beyond the face or planar surface 19 to facilitate the fabrication of a side crown on the tungsten carbide without affecting the surface 19. The upper blade could be made from a tungsten carbide solid circular disc, at greater cost.

For example, a tungsten carbide preformed ring 0.375 inch wide and about 0.300 thick was bonded to a mating groove cut into a 11¾ inch circular steel base ring with epoxy resins. Smooth mating surfaces were used to improve the bond. At a relief angle $\alpha$ of about 3°, referring to the planar surface 19 of wheel 12 or the planar surface of wheel 11 a first surface was ground into the side of the carbide ring. At a reverse angle $\beta$ of about 0.5°, also referring to the aforesaid planar surfaces of the wheels a second surface was ground into the ring. The intersection of the two surfaces was polished or honed to provide a smooth, slightly rounded or radiused crown on the side of the blade. The crown should have a radius of about 0.002–0.006 inches. The crown is located on the carbide blade so that it will be included within the overlap normally used between the carbide blade and the steel blade when cutting the tire cord fabric. With a lower square cut steel blade having about the same diameter as the carbide blade described, the overlap would be about 0.050–0.080 inches. With such an overlap, the crown should be located about 0.035–0.065 inches short of the outside diameter.

It should be understood that considerable force or pressure is applied to the blades, as illustrated by the arrows in FIG. 1. In cutting tire cord fabrics, a pressure of about 70 pounds is normally applied to the blades but may be as high as 400 pounds. While small overlaps are desirable, if the overlap is too small, the blades may spring apart or over each other. Too much overlap could damage the tire fabric being cut.

It should also be understood, that in cutting tire cord fabric, and other sheet materials, the rotary blades are not parallel. They are slightly offset from parallel, typically about ½° to 1°, to emphasize the cutting pinch of the blades. This slight offset is not shown in the drawing.

A number of advantages attend the use of the side crowned carbide blade of this invention, believed to be due to a continuous polishing or self-sharpening effect that is not present in the prior art where two high speed tool steel blades are used. Whereas the prior art blades require sharpening after about one month's use, the crowned blade-tool steel has run for over five months before resharpening was required. With the side crowned carbide blade, steel cord tire fabrics are able to be cut using lower side blade pressures, a contribution to the extended life. In cutting tire cord fabric, the lower blade rotates so the peripheral speed is about the same speed as the linear speed of the moving fabric. The upper blade is typically run at a higher speed than the lower blade. With the side crowned carbide blade, the upper blade has been run at higher than typical speeds. The higher speed is believed to enhance the self-sharpening or polishing effect obtained with the side crowned Carbide blade.

Generally, the relief angle $\alpha$ may be from about 1° to 3° and the reverse angle $\beta$ may vary from about ¼° to 1°. A slight radius is provided at the intersection of the angled surfaces, in the order of 0.002–0.006 inches. The location of the intersection of the surfaces, and consequently the location of the crown on the carbide blade, will vary with different cutting applications, including the type of fabric or sheet being cut, the side load on the blades, the offset angle of the blades, etc. In general, however, it is expected that the advantages of this invention will be provided if the distance of the crown, or the intersection of the angled surfaces, to the outside diameter of the blade is about 65 to 85 percent of the overlap that will be employed in cutting.

Tungsten carbide is, of course, a very hard material and therefore difficult to grind and polish. A series of diamond grit wheels were used to grind and polish a finish of 2–6 micro-inches over the crown area. A finish of 8–16 micro-inches is sufficient for the cooperating lower blade.

The tungsten carbide preform in this specific instance was obtained from Carbidie of Irwin, Pa. The Carbidie Grade CD-50 employed has 15 percent binder, a density of 13.90–14.10 grams/cc. and a hardness of $R_c$ 71.0–73.0. The Industry Code is G30. Other tungsten carbide preforms and discs, if desired, are available from other sources. Tungsten carbides having hardnesses in the range of $R_c$ 69–78 are generally suitable.

Figure 3:
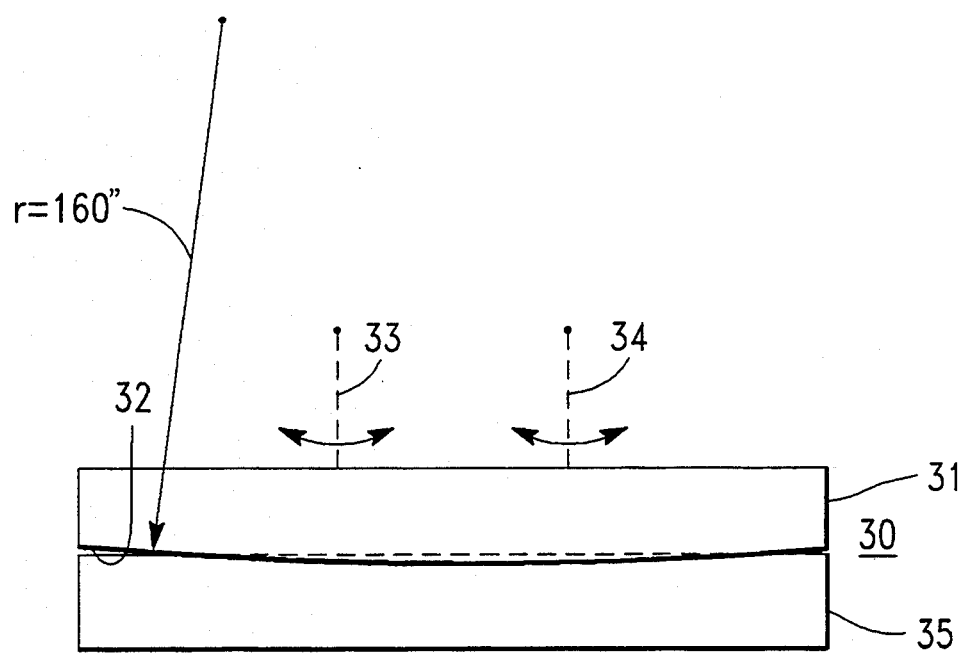
FIG. 3 is a side elevational view of scissor cutting blades.
Figure 4:
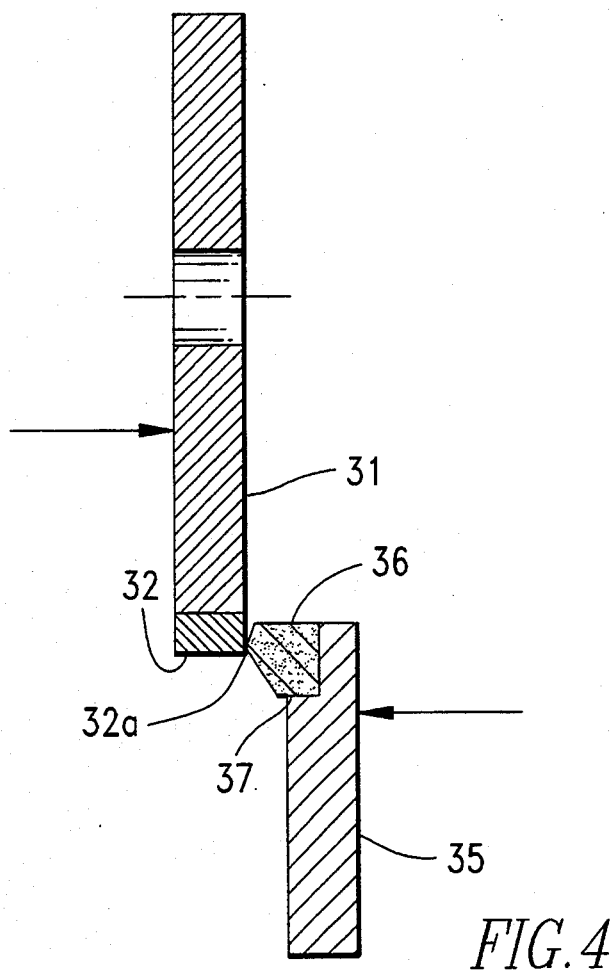
FIG. 4 is an enlarged cross-sectional view of the edges of the blades of FIG. 3.

Yet another embodiment of the invention is illustrated in FIGS. 3 and 4. This scissor cutting device 30 is also employed in bias cutting of tire cord fabrics. Referring now to FIG. 3, the upper blade 31 is about 90 inches long, 3½ inches wide and 0.375 inches thick. The upper blade 31 has a cutting edge 32 defined by a planar surface and a curved peripheral surface with a radius r of about 160 inches. As shown in cross-section in FIG. 4, the blade, because of its length, has a brazed tool steel insert to provide the cutting square edge. The upper blade has two moving pivots, schematically illustrated at 33, 34 of FIG. 3. The upper blade may be made herein with an insert of the high speed tool steels described hereinabove for the lower rotary blade.

In this embodiment, the lower blade 35, is fixed, generally rectangular with essentially the dimensions of the cooperative upper blade. However, in accordance with my invention, the lower overlapping blade has a longitudinal tungsten carbide insert 36 bonded to a complementary longitudinal slot 37. A plurality of tungsten carbide preforms may be used and bonded to the slot with epoxy resin. The mating edges of such preforms must be squared and smooth to provide the longer longitudinal cutting edge. The tungsten carbide described hereinabove as suitable for the upper rotary cutting blade, are suitable herein. Carbidie CD 30 preforms are being used with a hardness of Rockwell C 77–80, a density of 14.80–15.00 grams/cc and a binder content of 6 percent. The Industry Code for the tungsten carbide preforms is C-2, C-9. Like the rotary blade, this fixed blade has surfaces with the relief angle, reverse angle, crown, and finish characteristics described hereinabove as features of the rotary tungsten carbide blade. In shorter versions, the blade 35 may also be made from a single solid rectangular tungsten carbide preform, at greater cost than using a smaller insert. In shorter versions, the blade 31 may be made entirely from high speed tool steels, i.e. without the insert 32. Like the rotary blades, substantial side pressures, as illustrated by the arrows in FIG. 4, overlaps and offsets from parallelism to emphasize the cutting pinch are employed on the scissor blades when cutting tire cord fabric. The polishing or self-sharpening effect that is obtained with the rotary blades, should attend the scissor blades described. Thus, it would be useful to run the scissor blades for short periods even when tire fabric is not being cut, to improve sharpness.

It is also believed that the carbide blades described would provide similar advantages with spring loaded blades, that operate at substantially smaller side blade loads. Indeed, it is believed that the tungsten carbide blade would maintain the sharpness and extend the life of steel blades that are employed in burst cutting, where a single rotating blade is employed to slit sheet materials like paper, etc. By running continuously against a counter-rotating, overlapping tungsten carbide blade as described hereinabove, the sharpness of symmetrical edge and bevel edge rotating blades would be significantly prolonged. The tungsten carbide blade could be mounted to overlap the burst cutting blade away from the sheet being cut. The debris, typically associated sharpening devices, e.g., abrasive sticks periodically applied to rotating blades, would be eliminated.

I claim:

1. In combination with a first overlapping blade having a cutting edge defined by a planar surface and a curved peripheral surface, a second blade having a side portion and second peripheral surface both of tungsten carbide, a first surface in the side portion at a relief angle with respect to said planar surface and extending from the second peripheral surface, a second surface in said side portion at a reverse angle to said planar surface providing an intersection with said first surface, a smooth slightly radiused crown at the intersection of the first and second surfaces, the crown spaced from said second peripheral surface so that it contacts the first blade and is included within the overlap of the blades.

2. The combination of claim 1 wherein the relief angle is between about 1 and 3 degrees and the reverse angle is about ¼ to 1 degree, each with respect to the planar surface of the first blade.

3. The combination of claim 2 wherein the crown has a radius of about 0.002 to 0.006 inches.

4. The combination of claim 3 wherein said crown has a surface finish of about 2-6 micro-inches.

5. The combination of claim 1 wherin the second blade has a peripheral groove and the side portion and second peripheral surface of the second blade are defined by a preformed insert bonded to the groove.

6. The combination of claim 5 wherein said second blade is a circular disc and the preformed insert is an annular ring.

7. The combination of claim 6 wherein said first blade is a circular disc.

8. A device suitable for cutting tire cord fabrics comprising first and second rotatable shear wheels mounted for rotation about axes spaced apart so that the shear wheels overlap, the first shear wheel comprising a high speed steel disc having a square cutting edge, the second shear wheel comprising a circular disc having a side portion and peripheral surface both of tungsten carbide, a first surface in the side portion at a relief angle extending from the peripheral surface, a second surface in said side portion at a reverse angle, said angles providing an intersection between said surfaces, a smooth, slightly radiused crown at said intersection, the crown located on the side of the second disc and spaced from the peripheral surface so that it contacts the first shear wheel and is included within the overlap of the wheels.

9. The device of claim 8 wherein the square cutting edge of the first shear wheel is defined by a planar surface and a circular peripheral surface and the relief angle is from about 1° to 3° with respect to the planar surface and the reverse angle is about ¼° to 1°, with respect to said planar surface.

10. The device of claim 9 wherein the crown has a radius of about 0.002 to 0.006 inches.

11. The device of claim 10 wherein the peripheral surface has an outside diameter, the overlap between the shear wheels is about 0.050 to 0.080 inches and the crown is spaced within the overlap at a distance of about 0.065 inches from the outside diameter of the peripheral surface.

12. The device of claim 11 wherein the finish on the crown is about 2 to 6 micro-inches.

13. A scissors cutting device suitable for cutting moving tire cord fabric comprising a moveable upper and a fixed lower cutting blade, the upper blade comprising high speed steel and moveable about pivots so that it overlaps the lower blade when cutting fabric, the lower blade having a side portion and peripheral surface both of tungsten carbide, a first surface in said side portion at a relief angle extentending from the peripheral surface, a second surface in said side portion at a reverse angle, said angles providing an intersection between said surfaces, a smooth, slightly radiused crown at said intersection, the crown located on the side of the lower blade and spaced from said peripheral surface so that it contacts the upper blade and is included in the overlap of the blades when cutting.

14. The device of claim 13 wherein the upper blade has a cutting edge defined by a planar surface and a curved peripheral surface and the relief angle is from about 1° to 3° and the reverse angle is about ¼° to 1° each with respect to said planar surface.

15. The device of claim 14 wherein the crown has a radius of about 0.002 to 0.006 inches.

16. The device of claim 15 wherein the finish on the crown is about 2 to 6 micro-inches.

17. The device of claim 16 wherein the blades overlap from about 0.050 to 0.080 inches.

* * * * *